United States Patent
Ohno

(10) Patent No.: US 11,202,455 B2
(45) Date of Patent: Dec. 21, 2021

(54) METHOD FOR PRODUCING VEGETABLE FRESH CHEESE-LIKE FOOD PRODUCT

(71) Applicant: FUJI OIL HOLDINGS INC., Osaka (JP)

(72) Inventor: Yoshiko Ohno, Osaka (JP)

(73) Assignee: FUJI OIL HOLDINGS INC., Osaka (JP)

( * ) Notice: Subject to any disclaimer, the term of this patent is extended or adjusted under 35 U.S.C. 154(b) by 361 days.

(21) Appl. No.: 16/489,698

(22) PCT Filed: Feb. 21, 2018

(86) PCT No.: PCT/JP2018/006177
§ 371 (c)(1),
(2) Date: Aug. 29, 2019

(87) PCT Pub. No.: WO2018/159406
PCT Pub. Date: Sep. 7, 2018

(65) Prior Publication Data
US 2020/0113201 A1 Apr. 16, 2020

(30) Foreign Application Priority Data

Mar. 2, 2017 (JP) .............................. JP2017-039161

(51) Int. Cl.
*A23C 20/02* (2021.01)
*A23J 3/16* (2006.01)
*A23L 11/50* (2021.01)

(52) U.S. Cl.
CPC .............. *A23C 20/025* (2013.01); *A23J 3/16* (2013.01); *A23L 11/50* (2021.01); *A23V 2002/00* (2013.01)

(58) Field of Classification Search
CPC ........ A23V 2002/00; A23V 2250/5488; A23V 2250/5118; A23J 3/16; A23J 1/14; A23J 3/14; A23J 3/346; A23J 1/006; A23L 33/185; A23L 2/66; A23L 33/105; A23L 11/07; A23C 11/103; A23C 20/025; A23C 20/02; A23C 9/1315; A23C 20/00; A23C 19/0455
See application file for complete search history.

(56) References Cited

U.S. PATENT DOCUMENTS 3,982,025 A 9/1976 Hashimoto et al.
4,678,676 A * 7/1987 Ishizuka .............. A23C 20/005
426/573

FOREIGN PATENT DOCUMENTS

| JP | S596840 | 1/1984 |
|---|---|---|
| JP | S59146555 | 8/1984 |
| JP | S6078541 | 5/1985 |
| JP | 2009136158 | 6/2009 |
| JP | 4569630 | 10/2010 |
| JP | 2012075366 | 4/2012 |
| JP | 2013013395 | 1/2013 |
| JP | 2013013396 | 1/2013 |
| JP | 2013143931 | 7/2013 |
| JP | 2014060935 | 4/2014 |
| JP | 2016077211 | 5/2016 |
| NL | 7416061 | 6/1975 |
| WO | 9743906 | 11/1997 |
| WO | 0122830 | 4/2001 |
| WO | 2012169347 | 12/2012 |
| WO | 2015056737 | 4/2015 |
| WO | 2015166686 | 11/2015 |

OTHER PUBLICATIONS

Ana N.Rinaldoni et al., "Soft cheese-like product development enriched with soy protein concentrates", LWT-Food Science and Technology, vol. 55, No. 1, Sep. 3, 2013, pp. 139-147.
Hans-Peter Bachmann, "Cheese analogues: a review", International Dairy Journal, vol. 11, No. 4-7, Jul. 1, 2001, pp. 505-515.
"Search Report of Europe Counterpart Application", dated Jul. 17, 2020, p. 1-p. 9.
"Office Action of Europe Counterpart Application, Application No. 18761527.3-1105", dated Aug. 4, 2021, p. 1-p. 4.
"International Search Report (Form PCT/ISA/210) of PCT/JP2018/006177," dated May 29, 2018, with English translation thereof, pp. 1-4.

* cited by examiner

*Primary Examiner* — Hong T Yoo
(74) *Attorney, Agent, or Firm* — JCIPRNET

(57) ABSTRACT

Provided is a method for producing a vegetable fresh cheese-like food product which is free from dairy products, has a natural, fresh cheese-like dairy flavor and body, and has excellent spreadability and squeezability as a confectionery material. The pH of an emulsified oil composition which contains a soybean emulsified composition containing a specific protein and lipid, a specific soybean protein material having a reduced content of a lipophilic protein among soybean proteins, and a protein coagulant is adjusted to a pH of 5.5-6.3 using lactic acid fermentation and/or an organic acid.

24 Claims, No Drawings

METHOD FOR PRODUCING VEGETABLE FRESH CHEESE-LIKE FOOD PRODUCT

CROSS-REFERENCE TO RELATED APPLICATION

This application is a 371 application of the international PCT application serial no. PCT/JP2018/006177, filed on Feb. 21, 2018, which claims the priority benefits of Japan application no. 2017-039161, filed on Mar. 2, 2017. The entirety of the above-mentioned patent applications is hereby incorporated by reference herein and made a part of this specification.

TECHNICAL FIELD

The present invention relates to a method for a producing vegetable fresh cheese-like food product which is free from dairy products, has a natural fresh cheese-like dairy flavor and body, and has excellent spreadability and squeezability as a confectionery material.

BACKGROUND ART

Fresh cheese is immature or substantially immature cheese produced by forming curd by causing fresh cream or skim milk powder to undergo lactic acid fermentation and separating, excluding, and mixing whey from or with the curd, and has a lighter cheese odor than aging-type cheese, so the taste of freshly made cheese can be appreciated. Types of fresh cheese include a cheese with slightly sweet taste, the aroma of milk, and a refreshing light acidic taste (cream cheese, fromage blanc, cottage cheese, and the like) and a cheese that gives no acidic taste (mascarpone and ricotta), and properties thereof are diverse in a range from a semi-solid state to a paste state. In particular, mascarpone cheese is used in making western confectionery like tiramisu.

Demand for the above-described fresh cheese has been significantly increasing thanks to the soft texture and distribution in easy-to-eat small packages. On the other hand, since cheeses have a strong milky flavor, they have problems that a consumer may easily become fed up with them when he or she keeps consuming them, those who are not adapted for dairy products and show an allergic reaction with milk may not be able to consume them, and the like, and thus a new type of fresh cheese in which no dairy products are used is required.

Furthermore, vegetable protein food products have been evaluated since people are becoming ever more interested in health, and soybean protein such as that contained in soymilk, in particular, has gained attention as a healthy food product because it contains protein of good quality to the point of being called "meat grown from the field."

To provide vegetable fresh cheese-like food products in which the above-described dairy products are not used, various attempts to produce fresh cheese-like or cream cheese-like food products have been previously made by using soybean protein such as protein contained in soymilk or the like instead of using milk protein.

Patent Literature 1 discloses a cream cheese-like food product with respect to a method of making a cream cheese-like food product by using not only the protein part of soybean milk but also all nutrients thereof, in which soybean milk containing 6 to 19 wt. % of solids is emulsified by adding edible fats or oils, a stabilizer, and an emulsifier thereto, and heated, and then the emulsion being homogenized at a pressure of about 140 Kg/cm$^2$ or higher and cooled, then an organic acid being added thereto and kneaded, and further being cooled and solidified.

Patent Literature 2 discloses an emulsified composition that uses soymilk as a raw material for an emulsified food that exhibits a favorable emulsified state and has characteristics of preferred food texture and physical properties as a food in a weak acid region at a pH of 3.5 to 6.0, in which it is more difficult to emulsify soybean proteins which improve the appetite for emulsified foods, for which oil is emulsified in an aqueous phase of soymilk, which has been extracted from soybeans using an aqueous solution or hydrothermal solution containing monovalent or divalent salts, adjusted to have a pH of 3.5 to 6.0 with addition of an organic acid and a salt concentration of 0.2 to 4.0 in terms of ionic strength, and then heated, and thereby a weak acidic emulsion is obtained.

Patent Literature 3 discloses a cheese-like emulsified food product having excellent structure, and texture, and good nutrients, which can be conveniently obtained at a low price by using tofu as a main component, and kneading and heating a formulation containing tofu containing 10 to 50% of soybean solids, fats and oils, a thermocoagulable substance, and a stabilizer as essential components.

Since the food products disclosed in Patent Literature 1 to 3 use soybean proteins having a high water retention property as they are, they are likely to have a somewhat rough texture, insufficient smoothness, a disagreeable soy odor peculiar to soybeans, and even a poor fresh cheese-like dairy flavor.

Patent Literature 4 discloses a cream cheese-like food product having a smooth texture and a good flavor the same as cream cheese, in which a cream cheese-like acidic emulsion is obtained by using soybean proteins as a raw material, mixing the soybean protein raw material with oils or fats to prepare an emulsion, causing a protease to act on the soybean protein raw material in a neutral to alkaline range to partially hydrolyze the soybean protein, and acidifying the resultant emulsion. Although a cream cheese-like food product having a smooth texture and a good flavor can be obtained according to this method, it has a poor fresh cheese-like dairy flavor.

Patent Literature 5 discloses a low-price fresh cheese-like food product having a fresh cheese-like flavor and body, having excellent spreadability and squeezability even with a low milk fat, the fresh cheese-like food product containing vegetable oil, proteins, and water, and an 52L-type triglyceride (S indicates stearic acid and L indicates linoleic acid), and having a pH of 4.5 to 6.4. Although the food product has a texture and a body similar to those of fresh cheese since special oils or fats are used according to this method, when vegetable protein is used as a protein, the food product comes to have a dairy flavor which not sufficient for fresh cheese.

REFERENCE LIST

Patent Literature

Patent Literature 1: Japanese Patent Application Laid-Open (JP-A) No. S59-6840

Patent Literature 2: Japanese Patent Application Laid-Open (JP-A) No. S59-146555

Patent Literature 3: Japanese Patent Application Laid-Open (JP-A) No. S60-78541

Patent Literature 4: Japanese Patent No. 4569630
Patent Literature 5: Japanese Patent Application Laid-Open (JP-A) No. 2012-75366

SUMMARY

Technical Problem

Although vegetable fresh cheese-like or cream cheese-like food products have been proposed as described above, food products in which both a dairy flavor and body are compatible as in fresh cheese have not been obtained, and there is demand for vegetable fresh cheese-like food products particularly having an excellent dairy flavor and palatability.

An objective of the present invention is to provide a method for producing a vegetable fresh cheese-like food product which is free from dairy products, has a natural, fresh cheese-like dairy flavor and body, and has excellent spreadability and squeezability as a confectionery material.

Solution to Problem

The inventors have intensively studied to solve the above-described problems, and as a result, they found that a vegetable fresh cheese-like food product satisfying this objective can be obtained by adjusting a pH of an emulsified oil composition, which contains a soybean emulsified composition containing specific proteins and lipids, and a specific soybean protein material having a reduced content of a lipophilic protein among soybean proteins, and a protein coagulant, to a specific pH, and thereby the present invention has been completed.

That is, the present invention includes:

(1) A method for producing a vegetable fresh cheese-like food product in which a pH of an emulsified oil composition which contains 0.5 to 2.5 wt. % of protein derived from a soybean emulsified composition A, 1.0 to 3.5 wt. % of protein derived from a soybean protein material B, and 0.1 to 0.5 wt. % of a protein coagulant is adjusted to pH 5.5 to 6.3 using the lactic acid fermentation and/or an organic acid.

The soybean emulsified composition A: a soybean emulsified composition having a protein content per dry matter of 25 wt. % or more, a content of lipids (which refers to a content as a chloroform-methanol mixed solvent extract) of 100 wt. % or more with respect to the protein content, and an LCI value (a content of lipophilic protein included in soybean protein) of 55% or more.

The soybean protein material B: a soybean protein material having a content of lipophilic protein included in all proteins of 40% or less as an LCI value and a content of lipids (which refers to a content as a chloroform-methanol mixed solvent extract) with respect to a protein content of less than 10 wt. %.

(2) The method for producing a vegetable fresh cheese-like food product described in (1), in which a total amount of the protein derived from the soybean emulsified composition A and protein derived from the soybean protein material B is 2 to 5 wt. %.

(3) The method for producing a vegetable fresh cheese-like food product described in (1) or (2), in which a content ratio between the protein derived from the soybean emulsified composition A and the protein derived from the soybean protein material B is 0.1 to 2.

(4) The method for producing a vegetable fresh cheese-like food product described in any one of (1) to (3), in which the emulsified oil composition before pH adjustment contains 20 to 40 wt. % of vegetable oil.

(5) The method for producing a vegetable fresh cheese-like food product described in any one of (1) to (3), in which 20 to 40 weight of vegetable oil is mixed with 60 to 80 parts by weight of the emulsified oil composition after the pH adjustment.

(6) The method for producing a vegetable fresh cheese-like food product described in (1) to (5), in which the emulsified oil composition further contains 0.5 to 2 wt. % of soybean protein isolate and/or 0.5 to 3 wt. % of a starch.

Advantageous Effects of Invention

According to the present invention, it is possible to produce a vegetable fresh cheese-like food product which is free from dairy products, has a natural, fresh cheese-like dairy flavor and body, and has excellent spreadability and squeezability as a confectionery material.

DESCRIPTION OF EMBODIMENTS

The present invention is a method for producing a vegetable fresh cheese-like food product in which an emulsified oil composition in which a soybean emulsified composition A and a soybean protein material B are used together, containing 0.5 to 2.5 wt. % of protein derived from the soybean emulsified composition A, 1.0 to 3.5 wt. % of protein derived from the soybean protein material B, and 0.1 to 0.5 wt. % of a protein coagulant is adjusted to have a pH of 5.5 to 6.3 using lactic acid fermentation and/or an organic acid.

By adjusting the pH of the emulsified oil composition prepared by using the soybean emulsified composition A and the soybean protein material B together and further adding the protein coagulant thereto, it is possible to produce a vegetable fresh cheese-like food product having a significantly natural, fresh cheese-like dairy flavor in comparison to a fresh cheese-like or a cream cheese-like food product in which conventional soybean milk or whole fat soymilk, soybean powder, concentrated soybean protein, or soybean protein isolate is used as a protein raw material.

Soybean Emulsified Composition A

The soybean emulsified composition A used in the present invention is a material having a protein content per dry matter of 25 wt. % or more and a lipid content of 100 wt. % with respect to the protein content among materials in which soybean protein is emulsified with a lipid such as soymilk.

Further, it is particularly preferable to obtain a material from soybeans that has been denaturated in advance until a nitrogen solubility index (NSI) thereof enters a specific range. The soybean emulsified composition obtained from such a raw material is an emulsified composition having a particularly high content of lipophilic proteins (or lipoxygenase proteins as another indicator) other than glycinin or β-conglycinin among contained soybean proteins, and thus contains many neutral lipids and polar lipids. That is, the composition has a content protein per dry matter of 25 wt. % or more and a lipid content of 100 wt. % or more with respect to the protein content and has a lipophilic proteins content index (LCI) value of 55% or more and more preferably 60% or more. Here, an LCI value is an index for estimating a content of lipophilic proteins contained in proteins. Details of a composition of proteins and lipids in a soybean emulsified composition incorporate the description of Japanese Unexamined Patent Application Publication No. 2013-143931.

Protein of Soybean Emulsified Composition A

The protein content of the soybean emulsified composition A used in the present invention is 25 wt. % or more or preferably 30 wt. % or more per dry matter. In addition, although an upper limit of the protein content is not limited, it is preferably 50 wt. % or less, and more preferably 40 wt. % or less.

A protein content is measured as a nitrogen content using the Kjeldahl method in the present invention and obtained by multiplying the nitrogen content by 6.25 as a nitrogen conversion factor.

Lipids of Soybean Emulsified Composition A

A content of lipids in the soybean emulsified composition A used in the present invention is 100 wt. % or more, preferably 120 to 300 wt. %, and more preferably 120 to 200 wt. % with respect to the protein content, and thus a content of lipid is greater than that of protein.

A content of lipids is generally measured using an ether extraction method, but since the soybean emulsified composition contains a large amount of polar lipids that are difficult to extract using an ether in addition to neutral lipids, a lipid content in the present invention is a value calculated using an amount of extract extracted from a mixed solvent having a ratio of chloroform to methanol of 2:1 (volume ratio) over 30 minutes at a boiling point under normal pressure as a total lipid amount. For a solvent extraction device, a "Soxtec" manufactured by FOSS Ltd. can be used.

Dry Matter Content of Soybean Emulsified Composition A

The soybean emulsified composition A used in the present invention normally has a fresh cream-like property and has about 15 to 30 wt. % of normal dry matter, but a content thereof is not particularly limited. That is, the composition may be a liquid having a low viscosity by adding water thereto, may be a cream and having a higher viscosity after being processed such that it is concentrated, or may be powdery after being processed into a powder.

Manner of Production of Soybean Emulsified Composition A

The soybean emulsified composition A used in the present invention can be obtained by, for example, preparing a suspension or soymilk by adding water to whole fat soybeans, then fractionating by a centrifuge, and then separating the upper portion thereof having a lower specific gravity.

In addition, soybeans having specific properties may be used as a raw material to efficiently obtain a soybean emulsified composition having an LCI value of 55% or more. A soybean emulsified composition can be obtained by, for example, preparing a suspension by adding water to fat-containing soybeans such as whole fat soybeans having a nitrogen solubility index of 20 to 77, containing a specific water-soluble protein, and having a content of lipids of 15 wt. % or more, then separating the suspension into solids and liquids, causing neutral and polar lipids to transition to insoluble fractions, removing the soluble fractions containing proteins and sugar, and then recovering insoluble fractions. Details of the manner of production incorporate the description of Japanese Unexamined Patent Application Publication No. 2013-143931.

Soybean Protein Material B

The specific soybean protein material B used as a raw material in the present invention includes proteins mainly composed of glycinin and β-conglycinin extracted from soybeans as a main component and has a low content of lipophilic proteins in the all proteins.

That is, it is a soybean protein material having a content of lipophilic proteins in the all proteins of 40% or less as an LCI value.

Form of Product of Soybean Protein Material B

A form of product of the soybean protein material B is not particularly limited as long as the product satisfies the above-described requirements, and although soymilk is a specific example thereof, a form of a product produced by using soymilk as a raw material with an increased protein purity may be exemplified as a form of product other than soymilk, and, the form of soybean protein isolate with an increased protein purity due to removing water soluble components such as sugar or minerals from soybeans, and a form of fractionated soybean proteins with an increased purity of glycinin or β-conglycinin due to further fractionating the proteins of soymilk or soybean protein isolate may be typically exemplified.

Protein of Soybean Protein Material B

A protein content of the soybean protein material B is preferably in a range of 30 to 99 wt. % per dry matter. In a case in which a soybean protein material is in the form of soymilk, a lower limit of protein content can normally be 45 wt. % or more, 50 wt. % or more, or 55 wt. % or more, and an upper limit thereof can be 70 wt. % or less, or 65 wt. % or less per dry matter. A value thereof can also be in a range of 30 wt. % or more and less than 45 wt. % depending on a processing method such as fractionation of the proteins, addition of other components, or the like. In addition, in a case in which a soybean protein material is in the form of soybean protein isolate obtained by further refining soymilk and increasing the protein purity, a lower limit thereof can exceed 70 wt. % or can be 80 wt. % or more, and an upper value can be 99 wt. % or less, or 95 wt. % or less. Further, a protein content is measured as a nitrogen content using the Kjeldahl method in the present invention and obtained by multiplying the nitrogen content by 6.25 as a nitrogen conversion factor.

A lipophilic protein refers to the group of minor acid-precipitable soybean proteins other than glycinin (7S globulin) and β-conglycinin (11S globulin) among the main acid-precipitable soybean proteins of soybeans, and correspond to many polar lipids such as lecithin, glycolipids, and the like. A lipophilic protein may be abbreviated simply as "LP" below.

Since LP is mixed with miscellaneous proteins, it is difficult to identify every protein and exactly measure contents of LP, but the values thereof can be estimated by obtaining the following lipophilic protein content index (LCI; a content of lipophilic protein contained in soybean protein) value.

According to the definition, the LCI value of the protein included in the soybean protein material B is normally 40% or less, more preferably 38% or less, and more preferably 36% or less.

When a general soybean protein material is manufactured using normal non-denatured soybean (having an NSI value of 90 or higher) as a raw material, LP is in a soluble state, and thus it is extracted into a water soluble fraction when water is extracted from the material. On the other hand, since the soybean protein material B is produced by causing LP to be denatured and to become insoluble through heat treatment in raw soybeans, LP is difficult to extract and remains in the insoluble fraction.

As described above, a soybean protein material in which a content of lipids is maintained at the lowest level can be obtained by reducing a content of LP contained in proteins.

Compositional Analysis for Respective Components of Proteins

A composition for respective components of proteins of the soybean protein material B can be obtained by analysis using SDS polyacrylamide gel electrophoresis (SDS-PAGE).

Hydrophobic interactions between protein molecules, and hydrogen bonds and disulfide bonds between the molecules are broken due to the action of SDS which is a surfactant and mercaptoethanol which is a reducing agent, and negatively charged protein molecules show an electrophoretic distance according to specific molecular weights, and thereby proteins exhibit characteristic electrophoretic patterns. After staining the SDS gel with Coomassie brilliant blue (CBB), which is a dye, after the electrophoresis, the ratio of the density of bands corresponding to various protein molecules to the density of bands of all proteins can be obtained using a densitometer in a calculation method.

Method for estimating LP content and measuring LCI value (a) α Subunit and α' subunit (α+α') for 7S, acid subunit (AS) for 11S, and a 34 kDa protein and lipoxygenase protein (P34+Lx) for LP are selected as main protein components of each protein, and a staining ratio of each of the selected proteins is obtained using SDS-PAGE. Electrophoresis can be performed under the conditions of Table 1.

(b) X (%)=(P34+Lx)/{(P34+Lx)+(α+α')+AS}×100(%) is obtained.

(c) Since an LP content of soybean protein isolate prepared from low denatured defatted soybean is about 38%, a correction coefficient k*=6 is multiplied by (P34+Lx) to get X=38(%).

(d) That is, an estimated LP content (Lipophilic Proteins Content Index, which will be abbreviated as "LCI") is calculated using the following formula.

TABLE 1

Application amount: 10 μl of sample solution with 0.1% of protein to each well
Width of well: 5 mm
Volume of well: 30 μl
Staining solution: 1 g of Coomassie brilliant blue (CBB), 500 ml of methanol, and 70 ml of glacial acetic acid (after CBB is completely dissolved in methanol, acetic acid and water are added thereto to make up to 1 L)
Staining time: 15 hours
Decoloring time: 6 hours
Densitometer: GS-710 Calibrated Imaging Densitometer/Quantity One Software Ver. 4.2.3 (Bio Rad Japan Co., Ltd.) (scanning width: 5.3 mm, sensitivity: 30)

$$LCI\ (\%) = \frac{k^* \times (P34 + Lx)}{k^* \times (P34 + Lx) + (\alpha + \alpha') + AS} \times 100$$

k*: Correction coefficient (which is 6)
P34: 34 kDa Protein, a main component of LP
Lx: Lipoxygenase, a main component of LP
α: α Subunit, a main component of 7S
α': α' Subunit, a main component of 7S
AS: Acid subunit, a main component of 11S The soybean protein material B can include sugars and proteins as main components accounting for the most of dry matter, and a content of carbohydrates (dry matter free from lipids, proteins, and minerals) in that case is preferably 80 wt. % or more and more preferably 85 wt. % or more per dry matter in terms of the total content including protein. The rest of the dry matter is mostly composed of minerals and traces of lipids, and a content of minerals is normally 15 wt. % or less and preferably 10 wt. % or less per dry matter. While dietary fiber is contained in carbohydrates, the soybean protein material A is free from dietary fiber since it removed therefrom, and thus a content of dietary fiber is very small such as 3 wt. % or less, and preferably 2 wt. % or less per dry matter.

Lipid of Soybean Protein Material B

The soybean protein material B only includes lipids at a lower proportion than the ratio of lipid content/protein content of soybean powder which is a raw material, and a content of polar lipids is preferably low as well as neutral lipids. On the other hand, defatted soymilk or the like can be generally obtained by defatting soybeans using hexane and extracting water from the obtained defatted soybeans, and the defatted soymilk includes a large amount of polar lipids without removal.

For this reason, a content of lipids in the soybean protein material B is set to a value obtained by freeze-drying a sample, and then setting an amount of extract extracted from the sample in a solvent in which chloroform and methanol are mixed at a ratio of 2:1 (volume ratio) for 30 minutes at a boiling point under normal pressure as a total amount of lipids. For a solvent extraction device, "Soxtec" manufactured by FOSS Ltd. can be used. Further, the above-described measurement method will be referred to as "chloroform-methanol mixed solvent extraction method."

A content of lipids with respect to the protein content in the soybean protein material B is preferably less than 10 wt. %, more preferably less than 9 wt. %, more preferably less than 8 wt. %, more preferably less than 5 wt. %, and more preferably 4 wt. % or less, and can be 3 wt. % or less. That is, a soybean protein material in which a very small amount of all lipids is contained including neutral lipids and polar lipids is one preferable form in comparison to proteins. By applying the soybean protein material with less LP and a smaller amount of all lipids to lactic acid fermentation, it is possible to obtain a fresh flavored lactic acid fermented material that is very difficult to feel the disagreeable soy odor. As such a material, there is, for example, a "fat-reduced soybean protein material" disclosed in Japanese Unexamined Patent Application Publication No. 2012-16348. Although defatted soymilk extracted from soybeans defatted using an ordinary organic solvent is also almost free from neutral lipids, some polar lipids are extracted therefrom, thus a content of lipids with respect to a protein content is about 5 to 6 wt. %. In that case, a lipid content per dry matter is preferably 5 wt. % or less, preferably 3 wt. % or less, more preferably 2 wt. % or less, and even more preferably 1.5 wt. % or less.

Dry Matter Content of Soybean Protein Material B

When the soybean protein material B is liquid like the form of soymilk, dry matter thereof is generally about 3 to 20 wt. %; however, a form of the soybean protein material is not particularly limited. That is, it may be a material in a liquid state having low viscosity due to addition of water, a material having high viscosity due to concentration processing such as vacuum concentration, freeze concentration, or the like, or a material in a powdery state due to powder processing such as spray drying, freeze drying, or the like.

Although an emulsified oil composition is prepared using the soybean emulsified composition A, the soybean protein material B, and the protein coagulant together in the present invention, a content of protein derived from the soybean emulsified composition A is 0.5 to 2.5 wt. %, more preferably 1 to 2 wt. %, and most preferably 1 to 1.5 wt. %. When the content is less than the lower limit, the material tends to be far from a soymilk flavor and have little dairy flavor. On the contrary, when the content exceeds the upper limit, the material tends to have a little strong flavor of soymilk but tends to have little a dairy flavor after all. In addition, a content of protein derived from the soybean protein material B is 1.0 to 3.5 wt. %, and more preferably 1.5 to 3 wt. %. When the content is less than the lower limit, the material tends to be far from a soymilk flavor and have little dairy flavor. On the contrary, when the content exceeds the upper limit, the material tends to have a little strong flavor of soymilk but tends to have little dairy flavor after all.

In the present invention, a protein coagulant needs to be added to the emulsified oil composition before or after pH adjustment. Examples of the protein coagulant include glucono delta lactone, magnesium chloride, calcium sulfate, and bittern, and a more desirable example is bittern. An amount of the protein coagulant is 0.1 to 0.5 wt. % and preferably 0.1 to 0.3 wt. %. A vegetable fresh cheese-like food product having an excellent rich taste and body can be obtained by adding an appropriate amount of the protein coagulant.

In the present invention, a total amount of a protein derived from the soybean emulsified composition A and a protein derived from the soybean protein material B is preferably 2 to 5 wt. %, and more preferably 3 to 4.5 wt. %. When the total amount is less than 2 wt. %, the rich taste and dairy flavor become little. Conversely, when the total amount exceeds 5 wt. %, the material tends to have a little strong flavor of soymilk but tends to have little dairy flavor.

A content ratio between a protein derived from the soybean emulsified composition A and a protein derived from the soybean protein material B is preferably 0.1 to 2, and more preferably 0.2 to 1.5. when a content ratio is less than 0.1, the material tends to be far from a soymilk flavor and have little dairy flavor. Conversely, when the content exceeds the upper limit, the material tends to have a little strong flavor of soymilk but tends to have little dairy flavor after all.

Although the emulsified oil composition is prepared using the soybean emulsified composition A and the soybean protein material B together in the present invention, a manner of the preparation is as follows.

When a fresh creamy soybean emulsified composition (having a content of dry matter of 15 to 30 wt. %, a content of protein included in the dry matter of 25 to 50 wt. %, and a content of lipid included in the dry matter of 40 to 75 wt. %) disclosed in, for example, Japanese Unexamined Patent Application Publication No. 2013-143931 is used as the soybean emulsified composition A, and a fat-reduced soybean protein material (having a content of dry matter of 3 to 20 wt. %, a content of protein included in the dry matter of 45 to 70 wt. %, and a content of lipid included in the dry matter of 10 wt. % or less) disclosed in, for example, Japanese Unexamined Patent Application Publication No. 2012-16348 is used as the soybean protein material B, a target emulsified oil composition can be obtained by mixing 10 to 40 parts by weight of the soybean emulsified composition A with 30 to 60 parts by weight of the soybean protein material B, and preferably mixing the soybean emulsified composition A and the soybean protein material B to make a total amount thereof 60 to 80 parts by weight.

In another manner of preparing an emulsified oil composition in the present invention, a concentrate or dry powder thereof can be used as the soybean emulsified composition A instead of the above-described fresh creamy soybean emulsified composition. In addition, a concentrate or dry powder thereof can be used as the soybean protein material B instead of the above-described fat-reduced soybean protein material. When the concentrate or dry powder is used, an emulsified oil composition can be prepared by dispersing and dissolving the concentrate or dry powder in an appropriate amount of water to adjust a content of proteins derived from the soybean emulsified composition A and the soybean protein material B.

Although a pH of the emulsified oil composition is adjusted to pH 5.5 to 6.3 using the lactic acid fermentation and/or an organic acid in the present invention, when the pH adjustment is performed using lactic acid fermentation, the adjustment is performed using lactic acid bacteria until it becomes pH 5.5 to pH 6.3 at a temperature of 20 to 50° C. After fermentation to pH 3.8 to pH 4.8, the pH can also be adjusted to pH 5.5 to pH 6.3 using an alkaline salt. Although examples of types of lactic acid bacteria applied to the lactic acid fermentation include the genus *Lactobacillus*, the genus *Streptococcus*, the genus *Lactococcus*, the genus *Leuconostoc*, and the genus *Bifidobacterium*, a combination of two or more types of the lactic acid bacteria can also be arbitrarily used.

When the above-described pH adjustment is performed by adding an organic acid, one or two or more types of acid selected from acetic acid, lactic acid, citric acid, malic acid, tartaric acid, fumaric acid, adipic acid, and gluconic acid can be used. Although a concentration of an organic acid is not particularly limited, it is desirable to add 20 to 70 wt. % of an aqueous solution. In addition, the pH adjustment can also be performed by performing lactic acid fermentation and addition of an organic acid together.

The pH after the pH adjustment needs to be 5.5 to 6.3, more preferably 5.7 to 6.1, and most preferably 5.8 to 6.0. When the pH is lower than 5.5, a sour taste tends to be strong. When the pH exceeds 6.3, the fresh cheese-like flavor tends to be little.

In the present invention, it is preferable to mix 20 to 40 parts by weight of vegetable oil with 60 to 80 parts by weight of the emulsified oil composition. Mixing vegetable oil can impart fresh cheese-like moderate body, spreadability and squeezability as confectionery material. As vegetable oil, oil that can be used for food, has good meltability in the mouth and moderate shape retention, and has a melting point of 20 to 40° C. can be preferably widely adopted, examples thereof include, for example, rapeseed oil, soybean oil, sunflower oil, cottonseed oil, peanut oil, rice bran oil, corn oil, safflower oil, olive oil, kapok oil, sesame oil, evening primrose oil, palm oil, shea butter, monkey butter, cocoa butter, coconut oil, palm kernel oil, and the like, and the above-mentioned fats and oils alone or mixed oils or processed fats and oils obtained by curing, fractionating, esterifying, or the like can also be exemplified. When an amount of vegetable oil mixed in is less than 20 parts by weight, body, spreadability, or squeezability tends to be insufficient. Conversely, when the amount exceeds 40 parts by weight, the material tends to have a slightly oily texture and decreased fresh cheese-like freshness.

In the present invention, the above-described vegetable oil may be mixed with the emulsified oil composition at any time before or after the pH adjustment. Preferably, it may be mixed with the emulsified oil composition after the pH adjustment to make the pH adjustment work easier.

In the present invention, it is preferable to cause the emulsified oil composition before or after the pH adjustment to contain 0.5 to 2 wt. % of soybean protein isolate and/or 0.5 to 3 wt. % of a starch. The components contained in the composition can impart appropriate shape retention, syneresis resistance in refrigerated storage, and baking resistance to a vegetable fresh cheese-like food product. As a result, a vegetable fresh cheese-like food product having excellent spreadability and squeezability as a confectionery material can be produced. Although shape retention and baking resistance can be improved by addition of the soybean protein isolate, an addition amount thereof is preferably 0.5 to 2 wt. %. When the amount is less than 0.5 wt. %, the effect for improving shape retention and baking resistance becomes insufficient, and when the amount exceeds 2 wt. %, the product tends to have the disagreeable soy odor that is peculiar to soybean proteins. Shape retention and syneresis resistance in refrigerated storage can be imparted by addition of starches. An addition amount thereof is preferably 0.5 to 3 wt. %. When the amount is less than 0.5 wt. %, the effect for improving shape retention and syneresis resistance in refrigerated storage becomes insufficient. When the amount exceeds 3 wt. %, meltability in the mouth tends to deteriorate. Examples of the starch include starches obtained from corn, rice, potato, tapioca, wheat, and sweet potato and modified starches such as phosphorylated starch and pregelatinized starch thereof.

A sugar may be used for the vegetable fresh cheese-like food product of the present invention, and it may be any sugar such as sucrose, maltose, glucose, lactose, fructose, sorbitol, maltitol, and the like. In addition to these, lactose derived from a dairy product may be used.

An emulsifier that is generally used for preparing the vegetable fresh cheese-like food product can be appropriately selected and used for the vegetable fresh cheese-like food product of the present invention. Examples of the emulsifier include, for example, lecithin, monoglyceride, sorbitan fatty acid ester, propylene glycol fatty acid ester, polyglycerin fatty acid ester, polyoxyethylene sorbitan fatty acid ester, sucrose fatty acid ester, and the like.

Various salts can be used for the vegetable fresh cheese-like food product of the present invention. Examples of salts include hexametaphosphate, diphosphate, sodium citrate, polyphosphate, baking soda, and the like. A stabilizer, a perfume, a coloring agent, a preservative, and the like can be used if desired.

As a method for producing the vegetable fresh cheese-like food product of the present invention, for example, a method of performing homogenization, heat sterilization and, if necessary, further homogenization, filling, and cooling after the pH adjustment of the emulsified oil composition can be exemplified. The vegetable fresh cheese-like food product of the present invention obtained using the above-described method shows semi-solid to paste-like properties at refrigeration temperature to normal temperature and has physical properties excellent in spreadability and squeezability as a confectionery material.

EXAMPLES

Examples of the present invention will be described in more detail below. Further, both % and parts in the examples are based on weights.

Flavor Evaluation Method

For flavor evaluation for vegetable fresh cheese-like food products of each of examples, mousse-like foods were prepared as described below and flavors of the mousse-like foods were evaluated based on the average values presented by 5 panelists in terms of the following criteria.

Method for Preparing Mousse-Like Food

A mixture of 67 parts of egg yolk, 94 parts of granulated sugar, and the like, and 30 parts of water were added to and mixed with a mixture of 385 parts of a vegetable fresh cheese-like food product and 20 parts of white wine using a barter pump. The mixture was added to and mixed with 385 parts of Ko-cream whip (Ko-cream-based foamable oil-in-water emulsion; manufactured by Fuji Oil Co., Ltd.) that had been separately whipped for 7 minutes beforehand, poured to fill a small cup, left at 5° C. overnight, and thereby a tiramisu-like mousse-like food was obtained.

Flavor Evaluation Criteria (soymilk flavor): ◉ indicates good and refreshing soymilk flavor.
○ indicates slightly weak but refreshing soymilk flavor.
△ indicates too weak soymilk flavor.
× indicates no soymilk flavor or too strong soymilk flavor.
(Dairy flavor): ◉ indicates very good, ○ indicates good, △ indicates slightly weak, and × indicates no dairy flavor.
(Rich taste): ◉ indicates very good, ○ indicates good, △ indicates slightly weak, and × indicates no rich taste.

Example 1

40 parts of the soybean emulsion A ("Ko-cream" manufactured by Fuji Oil Co., Ltd.: a content of dry matter of 19.8%, a content of protein per dry matter of 28.3%, lipids per dry matter of 62.1%, and an LCI value of 67%), 28 parts of the soybean protein material B ("Bimi-Tonyu" manufactured by Fuji Oil Co., Ltd.: a content of dry matter of 10.0%, a content of protein per dry matter of 54.0%, lipids per dry matter of 5%, and an LCI value of 34%), and 0.2 pats of bittern were mixed together, heated at 30° C., mixed with addition of 1 part of a pH adjuster containing lactic acid, and left at 30° C. for 20 minutes. Then, 10 parts of palm ace 10 (refined palm super olein manufactured by Fuji Oil Co., Ltd.), 18 parts of refined hardened coconut oil (manufactured by Fuji Oil Co., Ltd.), 0.2 parts of salt, and 3.8 parts of water were added thereto while stirring them using a homomixer, the temperature thereof was raised up to 43° C., and thereby an emulsified oil composition having a pH of 5.74 was obtained. After homogenizing the emulsified oil composition with a homogenizer under pressure of 100

Kg/cm$^2$, the mixture underwent heat sterilization at 80° C. for 30 minutes and was cooled to 43° C., then was homogenized with a homogenizer again under pressure of 100 Kg/cm$^2$, poured to fill a 1-liter pillow container, was cooled to −25° C. for 20 minutes, and thereby a vegetable fresh cheese-like food product was obtained. A content of proteins derived from the soybean emulsion A of the food product was 2.2% (28.3×0.198×0.4), and a content of proteins derived from the soybean protein material B was 1.5% (54.0×0.10×0.28).

Example 2

A vegetable fresh cheese-like food product was prepared in a similar manner as in Example 1 by replacing 40 parts of the soybean emulsion A of Example 1 with 30 parts and 28 parts of the soybean protein material B with 38 parts. A content of proteins derived from the soybean emulsion A of the food product was 1.7% (28.3×0.198×0.3), and a content of proteins derived from the soybean protein material B was 2.1% (54.0×0.10×0.38).

Example 3

A vegetable fresh cheese-like food product was prepared in a similar manner as in Example 1 by replacing 40 parts of the soybean emulsion A of Example 1 with 20 parts and 28 parts of the soybean protein material B with 48 parts. A content of proteins derived from the soybean emulsion A of the food product was 1.1% (28.3×0.198×0.2), and a content of proteins derived from the soybean protein material B was 2.6% (54.0×0.10×0.48).

Example 4

A vegetable fresh cheese-like food product was prepared in a similar manner as in Example 1 by replacing 40 parts of the soybean emulsion A of Example 1 with 10 parts and 28 parts of the soybean protein material B with 58 parts. A content of proteins derived from the soybean emulsion A of the food product was 0.6% (28.3×0.198×0.1), and a content of proteins derived from the soybean protein material B was 3.1% (54.0×0.10×0.58).

Comparative Example 1

A vegetable fresh cheese-like food product was prepared in a similar manner as in Example 1 by replacing 40 parts of the soybean emulsion A of Example 1 with 0 parts and 28 parts of the soybean protein material B with 68 parts. A content of proteins derived from the soybean emulsion A of the food product was 0%, and a content of proteins derived from the soybean protein material B was 3.7% (54.0×0.10×0.68).

Comparative Example 2

A vegetable fresh cheese-like food product was prepared in a similar manner as in Example 1 by replacing 40 parts of the soybean emulsion A of Example 1 with 50 parts and 28 parts of the soybean protein material B with 18 parts. A content of proteins derived from the soybean emulsion A of the food product was 2.8% (28.3×0.198×0.5), and a content of proteins derived from the soybean protein material B was 1.0% (54.0×0.10×0.18).

Comparative Example 3

3 parts of hot water (90° C.) was added to one part of husk and embryo-removed soybean obtained by adding 10 parts of water thereto and being immersed at 85° C. for 60 minutes or longer to sufficiently absorb water (a content of water of 40 to 55%), the resultant material was processed using a grinder, a baking soda solution was added thereto, and thus a pH thereof was adjusted to be 7.3 or higher and 8.0 or lower. The resultant material was supplied to a homogenizer (manufactured by APV) and underwent homogenization treatment under pressure of 150 kg/cm$^2$. The homogenized ground fluid was separated by centrifugation at 3000 G for five minutes and whole fat soymilk and bean curd lees were obtained. The whole fat soymilk had 9.0% of solids, 4.5% of proteins, and a pH of 7.5. A vegetable fresh cheese-like food product was prepared in a similar manner as in Example 1 by replacing 40 parts of the soybean emulsion A and 28 parts of the soybean protein material B of Example 1 with 68 parts of the whole fat soymilk.

Table 2 shows the result of the flavor evaluation of the mousse-like foods prepared using the vegetable fresh cheese-like food products of Examples 1 to 4 and Comparative examples 1 to 3.

TABLE 2

|  | Example 1 | Example 2 | Example 3 | Example 4 | Comparative example 1 | Comparative example 2 | Comparative example 3 |
|---|---|---|---|---|---|---|---|
| Soybean emulsion A* | 40 | 30 | 20 | 10 | — | 50 | — |
| Soybean protein material B** | 28 | 38 | 48 | 58 | 68 | 18 | — |
| Whole fat soymilk |  |  |  |  |  |  | 68 |
| Protein derived from A* | 2.3 | 1.8 | 1.2 | 0.6 | 0 | 2.9 | — |
| Protein derived from B** | 0.5 | 0.7 | 0.8 | 1.0 | 1.2 | 0.3 | — |
| Content of proteins of A + B | 2.8 | 2.5 | 2.0 | 1.6 | 1.2 | 3.2 | — |
| A/B (ratio of protein contents) | 4.6 | 2.6 | 1.5 | 0.6 | — | 9.7 | — |
| Soymilk flavor | Δ | ◎ | ○ | Δ | Δ | Δ | Δ |
| Dairy flavor | ○ | ◎ | ◎ | ○ | Δ | Δ | Δ |
| Rich taste | ◎ | ○ | ◎ | ○ | X | ◎ | Δ |

Soybean emulsion A*: Ko-cream
Soybean protein material B**: Bimi-Tonyu

As shown in Table 2, Examples 1 to 4 in which specific amounts of the soybean emulsion A and the soybean protein material B were contained exhibited excellent soymilk flavor, dairy flavor, and rich tastes. Comparative example 1 in which the soybean emulsion A was not included and Comparative example 2 in which the content of the soybean emulsion A was very high exhibited weak soymilk flavor and dairy flavor. In addition, Comparative example 3 in which the whole fat soymilk was used instead of using the soybean emulsion A and the soybean protein material B together exhibited weak soymilk flavor, dairy flavor, and rich taste.

Comparative Example 4

A vegetable fresh cheese-like food product was prepared in a similar manner as in Example 2 instead of being free from 0.5 parts of bittern in Example 2. As a result of the flavor evaluation of a mousse-like food prepared using the vegetable fresh cheese-like food product as in Example 2, soymilk flavor, dairy flavor, and the rich taste were evaluated to be slightly weak, and the food had awkward and insufficient flavors.

Example 5

20 parts of the soybean emulsion A ("Ko-cream" manufactured by Fuji Oil Co., Ltd.: a content of dry matter of 19.8%, a content of protein per dry matter of 28.3%, lipids per dry matter of 62.1%, and an LCI value of 67%), 47 parts of the soybean protein material B ("Bimi-Tonyu" manufactured by Fuji Oil Co., Ltd.: a content of dry matter of 10.0%, a content of protein per dry matter of 54.0%, lipids per dry matter of 5%, and an LCI value of 34%), and 0.2 pats of bittern were mixed together, heated at 30° C., mixed with addition of 1 part of a bulk starter of lactic acid bacteria, and left at 30° C. for 20 minutes. Then, 10 parts of palm ace 10 (refined palm super olein manufactured by Fuji Oil Co., Ltd.), 18 parts of refined hardened coconut oil (manufactured by Fuji Oil Co., Ltd.), 0.2 parts of salt, one part of soybean protein isolate (product name: Prorina HD101R manufactured by Fuji Oil Co., Ltd.), 0.06 part of gellan gum (product name: Kelco gel manufactured by CP Kelco), and 3.5 parts of water were added thereto while stirring using a homomixer, the temperature thereof was raised up to 43° C., and thereby an emulsified oil composition was obtained. 0.1% of lactic acid 50% was added to the emulsified oil composition to be adjusted to have a pH 5.74, the composition was homogenized under pressure of 100 Kg/cm$^2$ using a homogenizer, was heat sterilized at 80° C. for 30 minutes, cooled to 43° C., homogenized again under pressure of 100 Kg/cm$^2$ using a homogenizer, poured to fill a 1-liter pillow container, and cooled to −25° C. for 20 minutes, and thereby a vegetable fresh cheese-like food product was obtained. A content of proteins derived from the soybean emulsion A of the food product was 1. 1% (28.3×0.198×0.2), and a content of proteins derived from the soybean protein material B was 2.5% (54.0×0.10×0.47).

Example 6

A vegetable fresh cheese-like food product was obtained in a similar manner as in Example 5 by replacing one part of the soybean protein isolate of Example 5 with one part of a starch (product name: Starch 100 manufactured by Nippon Starch Chemical Co., Ltd.).

Example 7

A vegetable fresh cheese-like food product was obtained in a similar manner as in Example 5 by replacing 47 parts of "Bimi-Tonyu" with 46 parts of Example 5 and replacing one part of the soybean protein isolate with one part of soybean protein isolate and one part of a starch (product name: Starch 100 manufactured by Nippon Starch Chemical Co., Ltd.).

Shape retention, syneresis resistance in refrigerated storage, and baking resistance of Examples 3 and 5 to 7 were evaluated using the following method.

Shape Retention

Hardness after storage for 3 days at 5° C. was measured using a rheometer (g/a 3 cm-plunger), and a hardness of 200 to 1000 g with spreadability and squeezability was set to "pass."
Measurement conditions: A temperature of 5° C., a plunger having a diameter of 3 cm, a table speed of 5 cm/minute, manufactured by Fodo Kougyou Inc.

Syneresis Resistance in Refrigerated Storage

An artificial flower made of a vegetable fresh cheese-like food product using a pastry bag was left in a thermostat at 5° C. for 10 days and was visually evaluated for the degree of syneresis.
◉ indicates no syneresis occurred, ○ indicates slight syneresis, Δ: considerable syneresis, and × indicates much syneresis Baking Resistance Filter paper was placed in a heat-resistant container with a round lid having an inner diameter of 8.5 cm and a thickness of 3 cm, 10 g of the vegetable fresh cheese-like food product was squeezed using a round ferrule having an inner diameter of 13 mm on the filter paper, water equivalent to 10 wt. % of the vegetable fresh cheese-like food product was added to the filter paper, and the food product was baked in an oven at 200° C. for 10 minutes. The heights of the food product before and after baking were measured, and then the height decrease rate was calculated using the following formula.

Height decrease rate (%)={(Height before baking−Height after baking)/Height before baking}×100

A food product having baking resistance with a height decrease rate of 50% or less is preferable and has moderate shape retention after baking.
◉: a decrease rate of 30% or less, ○: a decrease rate of 50% or less, Δ: a degrease rate of 70% or less, ×: a decrease rate exceeding 70%

Table 3 shows evaluation results of shape retention, syneresis resistance in refrigerated storage, and baking resistance of Examples 3 and 5 to 7.

TABLE 3

|  | Example 3 | Example 5 | Example 6 | Example 7 |
|---|---|---|---|---|
| Soybean emulsion A* | 20 | 20 | 20 | 20 |
| Soybean protein material B** | 48 | 47 | 47 | 46 |
| Soybean protein isolate | — | 1 | — | 1 |
| Starch (Starch 100) | — | — | 1 | 1 |
| Shape retention | 140 | 620 | 210 | 230 |
| Resistance to Syneresis | X | X | ○ | ◉ |
| Baking resistance | X | ○ | x | ◉ |

Soybean emulsion A*: Ko-cream
Soybean protein material B**: Bimi-Tonyu

While the food product of Example 3 that is free from soybean protein isolate and starch had a soft body and spreadability, it did not have syneresis resistance in refrigerated storage and baking resistance as shown in Table 3. The food product of Example 5 to which the soybean protein isolate was added exhibited favorable baking resistance. On the other hand, the food product of Example 6 to which a starch was added exhibited improved syneresis resistance. The food product of Example 7 in which the soybean protein isolate and starch were blended exhibited both excellent syneresis resistance and baking resistance.

INDUSTRIAL APPLICABILITY

According to the present invention, a vegetable fresh cheese-like food product can be produced, which is free from dairy products, has a natural, fresh cheese-like dairy flavor and body, and has excellent spreadability and squeezability as a confectionery material.

What is claimed is:

1. A method for producing a vegetable fresh cheese-like food product, comprising:
    performing a pH adjustment of an emulsified oil composition which comprises 0.5 to 2.5 wt. % of protein derived from a soybean emulsified composition A, 1.0 to 3.5 wt. % of protein derived from a soybean protein material B, and 0.1 to 0.5 wt. % of a protein coagulant to pH 5.5 to 6.3 using a lactic acid fermentation and/or an organic acid,
    the soybean emulsified composition A: a soybean emulsified composition having a protein content per dry matter of 25 wt. % or more, a content of lipids, which refers to a content as a chloroform-methanol mixed solvent extract, of 100 wt. % or more with respect to the protein content, and an LCI value, a content of lipophilic proteins included in soybean protein, of 55% or more; and
    the soybean protein material B: a soybean protein material having a content of lipophilic proteins included in all proteins of 40% or less as an LCI value and a content of lipids, which refers to a content as a chloroform-methanol mixed solvent extract, with respect to a protein content of less than 10 wt. %.

2. The method for producing a vegetable fresh cheese-like food product according to claim 1, wherein a total amount of the protein derived from the soybean emulsified composition A and the protein derived from the soybean protein material B is 2 to 5 wt. %.

3. The method for producing a vegetable fresh cheese-like food product according to claim 1, wherein a content ratio between the protein derived from the soybean emulsified composition A and the protein derived from the soybean protein material B is 0.1 to 2.

4. The method for producing a vegetable fresh cheese-like food product according to claim 1, wherein the emulsified oil composition before the pH adjustment comprises 20 to 40 wt. % of vegetable oil.

5. The method for producing a vegetable fresh cheese-like food product according to claim 1, comprising mixing 20 to 40 parts by weight of vegetable oil with 60 to 80 parts by weight of the emulsified oil composition after the pH adjustment.

6. The method for producing a vegetable fresh cheese-like food product according to claim 1, wherein the emulsified oil composition further comprises 0.5 to 2 wt. % of soybean protein isolate and/or 0.5 to 3 wt. % of a starch.

7. The method for producing a vegetable fresh cheese-like food product according to claim 2, wherein a content ratio between the protein derived from the soybean emulsified composition A and the protein derived from the soybean protein material B is 0.1 to 2.

8. The method for producing a vegetable fresh cheese-like food product according to claim 2, wherein the emulsified oil composition before the pH adjustment comprises 20 to 40 wt. % of vegetable oil.

9. The method for producing a vegetable fresh cheese-like food product according to claim 3, wherein the emulsified oil composition before the pH adjustment comprises 20 to 40 wt. % of vegetable oil.

10. The method for producing a vegetable fresh cheese-like food product according to claim 7, wherein the emulsified oil composition before the pH adjustment comprises 20 to 40 wt. % of vegetable oil.

11. The method for producing a vegetable fresh cheese-like food product according to claim 2, comprising mixing 20 to 40 parts by weight of vegetable oil with 60 to 80 parts by weight of the emulsified oil composition after the pH adjustment.

12. The method for producing a vegetable fresh cheese-like food product according to claim 3, comprising mixing 20 to 40 parts by weight of vegetable oil with 60 to 80 parts by weight of the emulsified oil composition after the pH adjustment.

13. The method for producing a vegetable fresh cheese-like food product according to claim 7, comprising mixing 20 to 40 parts by weight of vegetable oil with 60 to 80 parts by weight of the emulsified oil composition after the pH adjustment.

14. The method for producing a vegetable fresh cheese-like food product according to claim 2, wherein the emulsified oil composition further comprises 0.5 to 2 wt. % of soybean protein isolate and/or 0.5 to 3 wt. % of a starch.

15. The method for producing a vegetable fresh cheese-like food product according to claim 3, wherein the emulsified oil composition further comprises 0.5 to 2 wt. % of soybean protein isolate and/or 0.5 to 3 wt. % of a starch.

16. The method for producing a vegetable fresh cheese-like food product according to claim 4, wherein the emulsified oil composition further comprises 0.5 to 2 wt. % of soybean protein isolate and/or 0.5 to 3 wt. % of a starch.

17. The method for producing a vegetable fresh cheese-like food product according to claim 5, wherein the emulsified oil composition further comprises 0.5 to 2 wt. % of soybean protein isolate and/or 0.5 to 3 wt. % of a starch.

18. The method for producing a vegetable fresh cheese-like food product according to claim 7, wherein the emulsified oil composition further comprises 0.5 to 2 wt. % of soybean protein isolate and/or 0.5 to 3 wt. % of a starch.

19. The method for producing a vegetable fresh cheese-like food product according to claim 8, wherein the emulsified oil composition further comprises 0.5 to 2 wt. % of soybean protein isolate and/or 0.5 to 3 wt. % of a starch.

20. The method for producing a vegetable fresh cheese-like food product according to claim 9, wherein the emulsified oil composition further comprises 0.5 to 2 wt. % of soybean protein isolate and/or 0.5 to 3 wt. % of a starch.

21. The method for producing a vegetable fresh cheese-like food product according to claim 10, wherein the emulsified oil composition further comprises 0.5 to 2 wt. % of soybean protein isolate and/or 0.5 to 3 wt. % of a starch.

22. The method for producing a vegetable fresh cheese-like food product according to claim 11, wherein the emulsified oil composition further comprises 0.5 to 2 wt. % of soybean protein isolate and/or 0.5 to 3 wt. % of a starch.

23. The method for producing a vegetable fresh cheese-like food product according to claim 12, wherein the emulsified oil composition further comprises 0.5 to 2 wt. % of soybean protein isolate and/or 0.5 to 3 wt. % of a starch.

24. The method for producing a vegetable fresh cheese-like food product according to claim 13, wherein the emulsified oil composition further comprises 0.5 to 2 wt. % of soybean protein isolate and/or 0.5 to 3 wt. % of a starch.

* * * * *